United States Patent
Moffitt

(10) Patent No.: US 11,243,003 B2
(45) Date of Patent: Feb. 8, 2022

(54) DEMAND CONTROL VENTILATION WITH PREDICTIVE HUMIDITY CONTROL

(71) Applicant: Trane International Inc., Davidson, NC (US)

(72) Inventor: Ronnie R. Moffitt, Harrodsburg, KY (US)

(73) Assignee: Trane International Inc., Davidson, NC (US)

(*) Notice: Subject to any disclaimer, the term of this patent is extended or adjusted under 35 U.S.C. 154(b) by 155 days.

(21) Appl. No.: 16/539,097

(22) Filed: Aug. 13, 2019

(65) Prior Publication Data

US 2021/0048208 A1 Feb. 18, 2021

(51) Int. Cl.
 *F24F 11/30* (2018.01)
 *F24F 7/06* (2006.01)
 (Continued)

(52) U.S. Cl.
 CPC ............ *F24F 11/30* (2018.01); *F24F 3/1405* (2013.01); *F24F 7/06* (2013.01); *F24F 11/65* (2018.01); *F24F 11/72* (2018.01); *G05B 19/042* (2013.01); *F24F 2003/1446* (2013.01); *F24F 2011/0002* (2013.01); *F24F 2110/20* (2018.01); *F24F 2110/22* (2018.01); *F24F 2110/70* (2018.01);
 (Continued)

(58) Field of Classification Search
 CPC .......................... F24F 2110/70; F24F 2140/40
 USPC ........................................................ 700/276
 See application file for complete search history.

(56) References Cited

U.S. PATENT DOCUMENTS 5,062,276 A * 11/1991 Dudley ................... F24F 11/00
 62/176.6
7,044,397 B2 5/2006 Bartlett et al.
 (Continued)

FOREIGN PATENT DOCUMENTS

JP H0861752 A * 3/1996
WO WO-2007131989 A2 * 11/2007 ............... G01K 1/20

OTHER PUBLICATIONS

Metelskiy, "Demand Controlled Ventilation Systems CO2 controlled ventilation systems" Mikkeli University Bachelor's Thesis, Sep. 2011, 33 pages (Year: 2011).*

(Continued)

*Primary Examiner* — Emilio J Saavedra
(74) *Attorney, Agent, or Firm* — Womble Bond Dickinson (US) LLP

(57) ABSTRACT

Systems, apparatus and methods for operating an environmental control system that delivers dehumidified outdoor air into a conditioned space through an air valve. The method includes establishing $CO_2$ setpoints corresponding to a ventilation outdoor air flow rate and a dehumidification outdoor air flow rate, determining a humidity metric of the conditioned space, and delivering outside air to the conditioned space at the ventilation outdoor air flow rate or dehumidification outdoor air flow rate based upon the humidity metric. The outside air may be tempered with return air from the conditioned space. The dehumidification $CO_2$ set point is determined by predicting the dehumidification $CO_2$ set point based on the airflow quantity per occupant and the relationship of the occupant predicted water vapor emission rate and $CO_2$ emission rate.

20 Claims, 6 Drawing Sheets

(51) Int. Cl.

| | |
|---|---|
| *F24F 11/65* | (2018.01) |
| *F24F 11/72* | (2018.01) |
| *G05B 19/042* | (2006.01) |
| *F24F 3/14* | (2006.01) |
| *F24F 11/00* | (2018.01) |
| *F24F 110/20* | (2018.01) |
| *F24F 110/22* | (2018.01) |
| *F24F 110/70* | (2018.01) |
| *F24F 120/12* | (2018.01) |
| *F24F 130/10* | (2018.01) |
| *F24F 140/40* | (2018.01) |

(52) U.S. Cl.
CPC ....... *F24F 2120/12* (2018.01); *F24F 2130/10* (2018.01); *F24F 2140/40* (2018.01); *G05B 2219/2614* (2013.01)

(56) References Cited

U.S. PATENT DOCUMENTS

| | | | |
|---|---|---|---|
| 7,266,960 | B2 | 9/2007 | Shah |
| 7,475,828 | B2 | 1/2009 | Bartlett et al. |
| 8,147,302 | B2 | 4/2012 | Desrochers et al. |
| 8,645,495 | B2 | 2/2014 | Johnson et al. |
| 8,651,391 | B2 | 2/2014 | Patch |
| 9,494,334 | B2 | 11/2016 | Sipe et al. |
| 9,618,224 | B2 | 4/2017 | Emmons et al. |
| 9,702,578 | B2 * | 7/2017 | Yonezawa ............ F24F 11/0008 |
| 2003/0181158 | A1 | 9/2003 | Schell et al. |
| 2010/0082161 | A1 * | 4/2010 | Patch ................ F24F 11/30 700/276 |
| 2011/0088455 | A1 * | 4/2011 | Takagi .................. F24F 11/30 73/29.02 |
| 2011/0264273 | A1 * | 10/2011 | Grabinger ............ F24F 11/0001 700/276 |
| 2015/0105917 | A1 * | 4/2015 | Sasaki ................ G05D 23/1904 700/276 |
| 2017/0123440 | A1 | 5/2017 | Mangsuli et al. |
| 2018/0106491 | A1 * | 4/2018 | Abrishamkar ........... F24F 11/54 |
| 2018/0299153 | A1 | 10/2018 | Ajax et al. |
| 2019/0154285 | A1 * | 5/2019 | Pham ...................... F24F 11/86 |

OTHER PUBLICATIONS

Trane, "Dedicated Outdoor Air Systems Trane DX Outdoor Air Unit" Application Guide, Trane, 2012, 24 Pages (Year: 2012).*

Schell et al., "Application of CO2-Based Demand-Controlled Ventilation Using ASHRAE Standard 62: Optimizing Energy Use and Ventilation"ASHRAE Transactions Symposia vol. 104, (1998): pp. 1213-1225 (Year: 1998).*

Guyot et al., "Smart ventilation energy and indoor air quality performance in residential buildings: A review" Energy and Buildings, 165, Apr. 15, 2018, 92 pgs (Year: 2018).*

Ashrae, "High Performance Sequences of Operaion for HVAC Systems" ANSI/ASHRAE Guide 36-2018, Jun. 2018, 102 Pgs (Year: 2018).*

Schell, "Measuring The Right Thing For Humidity Control . . . It's the Dew Point Stupid!" AirTest Technologies Corp., version of an article appearing in Jun. 2004 edition of Indoor Air Connections, 6 pages (Year: 2004).*

Driver, "Humidity Solutions for Retail HVAC: 5 Ways to Control Humidity with Small HVAC Systems" Dwyer Engineering Blog (www.dwyer.com/blog/humidity-solutions-for-retail-mep-with-small-hvac-systems) Posted May 21, 2014, 7 pg. PDF printout (Year: 2014).*

Emmerich et al., "State-of-the Art Review of CO2 Demand Controlled Ventilation Technology and Application" National Institute of Standards and Technology, Mar. 2001, 47 Pgs (Year: 2007).*

Owen et al., "CO2-based demand controlled ventilation under new ASHRAE Standard 62.1-2010: a case study for a gymnasium of an elementary school at West Lafayette, Indiana" Energy and Buildings 43 (2011) pp. 3216-3225 (Year: 2001).*

Lennox Industries Inc., "Humiditrol: Dehumidification Systems For Commercial Rooftop Units and Split Systems" 2016, 6 pgs. (Year: 2016).*

Dedicated Outdoor Air Systems: Trane DX Outdoor Air Unit, Trane Application Guide SYS-APG001-EN, Aug. 3, 2012.

ANSI/ASHRAE Standard 62.1-2016, Ventilation for Acceptable Indoor Air Quality, Mar. 2016.

ASHRAE Guideline 36-2018, High-Performance Sequences of Operation for HVAC Systems, Jun. 2018.

* cited by examiner

DEMAND CONTROL VENTILATION WITH PREDICTIVE HUMIDITY CONTROL

TECHNICAL FIELD

The present disclosure is directed to systems, apparatus, and methods for controlling humidity in a conditioned space having varying occupancy by delivering a predicted amount of dehumidified air required to proactively dehumidify the space.

BACKGROUND

Heating, ventilation, and air conditioning systems (HVAC systems) typically utilize one or more sensors, thermostats, and/or HVAC controllers to monitor environmental conditions in a conditioned space, and to operate HVAC equipment installed at the site. Densely populated common spaces, such as classrooms, lecture halls, conference rooms, lobbies, etc. are often are often ventilated with outside air by a Dedicated Outdoor Air System (DOAS) that dehumidifies outdoor air which is then supplied to the conditioned space.

Current humidity control systems work by increasing the amount of outside air supplied by the DOAS to the conditioned space in response to humidity increases beyond a limit or set point. Since the population of common spaces can vary considerably, this can cause wide swings in the amount of air provided to the space once it is occupied. These wide swings impair comfort, impact the acoustics of the space as the system attempts to deliver the large volumes of air needed to manage humidity, and adversely impacts stable DOAS system performance.

When occupancy varies, a reactive control system may not have time to stabilize before the population changes again. Wide swings in airflow at the DOAS are especially problematic for direct expansion (DX) DOAS equipment that uses the vapor-compression refrigeration cycle because abrupt changes in airflow causes wide swings in temperature and high supply duct relative humidity. Reactive control additionally requires a second control computation to determine DOAS air flow volume based on humidity in the space. This is in addition to the airflow volume calculation required to maintain $CO_2$ in the space at a level required for demand control ventilation. A current proposal to ASHRAE 62.1 suggests adding humidity dew point limits to all spaces. However, such solutions are complex and costly to implement. A simple and cost-effective method to effectively control humidity would be a welcome advance.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later.

An example method of operating an environmental control system that delivers dehumidified outdoor air into a conditioned space through an air valve in accordance with the present disclosure includes establishing a ventilation $CO_2$ setpoint corresponding to a ventilation outdoor air flow rate and establishing a dehumidification $CO_2$ setpoint corresponding to a dehumidification outdoor air flow rate. A humidity metric of the conditioned space is determined. If the humidity metric is above a predetermined threshold, the air valve is adjusted to deliver dehumidified air into the conditioned space at the dehumidification outdoor air flow rate. If the humidity metric is below a predetermined threshold, the air valve is adjusted to deliver dehumidified air into the conditioned space at the ventilation outdoor air flow rate. Establishing the dehumidification $CO_2$ set point includes predicting the dehumidification $CO_2$ set point from the airflow quantity per occupant and the relationship of the occupant predicted water vapor emission rate and $CO_2$ emission rate.

An example environmental control system in accordance with the present disclosure includes a dedicated outdoor air unit, an air valve in fluid communication with the dedicated outdoor air unit, a terminal unit in fluid communication with the air valve, and a controller in operative communication with the air valve and comprising a processor and a memory, wherein the memory includes instructions executable on the processor which, when executed by the processor, cause the processor to execute the method of operating an environmental control system that delivers dehumidified outdoor air into a conditioned space through an air valve described herein.

An example environmental system controller in accordance with the present disclosure includes a processor, a communications interface operatively coupled to the processor, and a memory operatively coupled to the processor, wherein the memory includes instructions executable on the processor which, when executed by the process, cause the processor to execute the method of operating an environmental control system that delivers dehumidified outdoor air into a conditioned space through an air valve described herein.

BRIEF DESCRIPTION OF THE DRAWINGS

Various embodiments of the disclosed system and method are described herein with reference to the drawings wherein.

Figure 1:
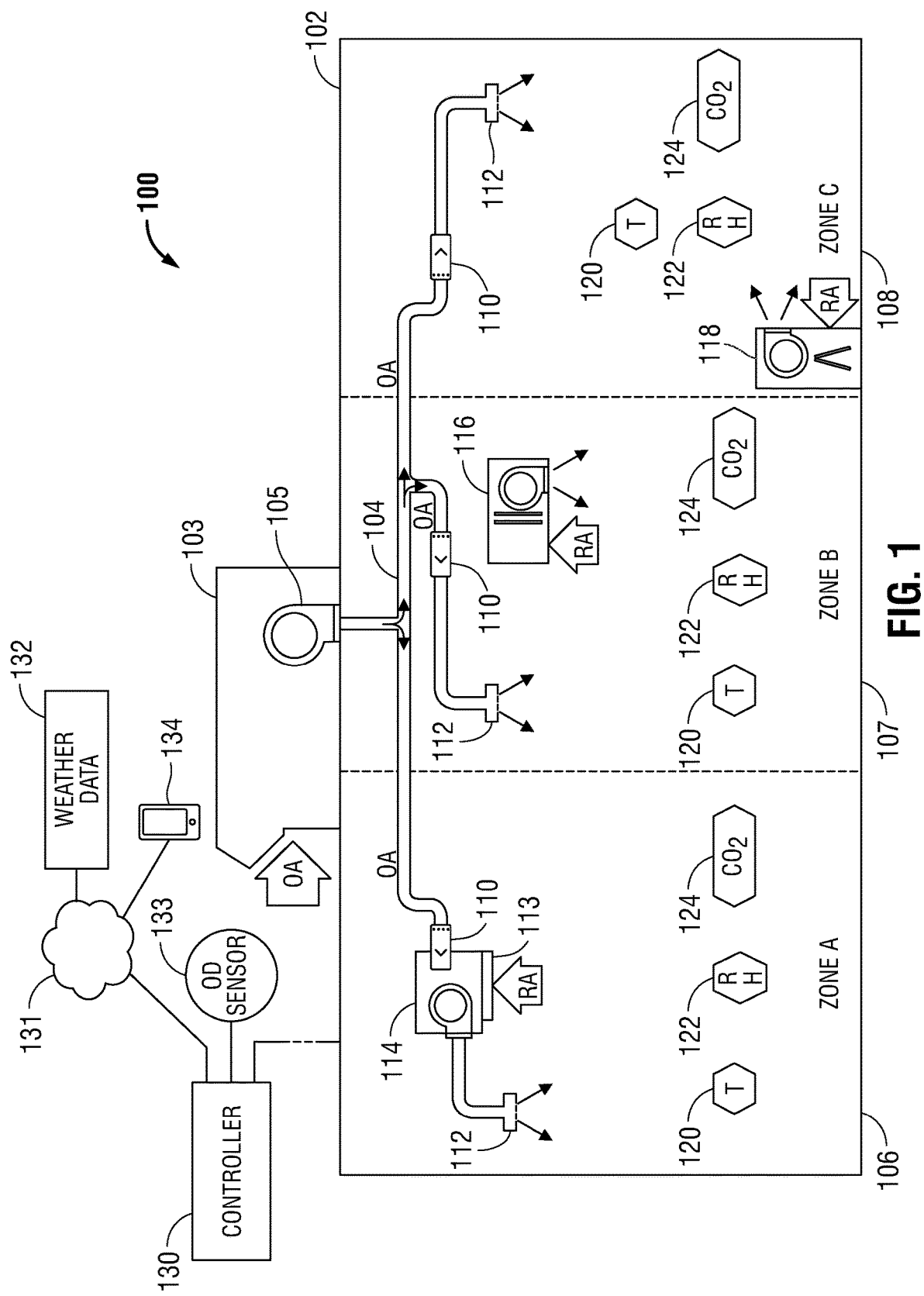
FIG. 1 is schematic diagram of a humidity control system in accordance with an example, non-limiting embodiment of the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings, however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks and/or processing steps may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language, with the various algorithms being implemented with any combination of data structures, objects, processes, routines or other programming elements. The object code created may be executed by any device, on a variety of operating systems.

As noted in the background section, humidity control can be accomplished introducing dehumidified outside air supplied by a Dedicated Outdoor Air System (DOAS) into the conditioned space. Ventilation air may be varied based on occupancy of the space as required by building and energy codes, a technique known as Demand Control Ventilation (DCV). Occupancy can be indicated by counting (turnstiles, video analytics, photocell-based counters, sensing floor mats etc.), occupancy sensors, or humidity measurements of the air within the conditioned space. However, traditional humidity control solutions can be complex and costly to implement, and can suffer from slow response times and wide swings in humidity leading to occupant discomfort Buildings with terminal equipment such as Variable Refrigerant Flow units (VRF) or chilled water (CW) fan coil units typically lack DOAS humidity control. This is because spaces of the size for which VRF or CW systems are well-suited have a lower ventilation rate insufficient for a DOAS to properly dehumidify the space. Although at peak cooling times, VRF or CW may achieve satisfactory dehumidification through conventional evaporator coil condensation, during part-load cooling times, dehumidification depends solely on DOAS air, which is insufficient to control humidity in such spaces. As a result the space humidity may increase to uncomfortable levels for the occupants and/or promote mold and/or mildew formation.

Another consideration is the difference between sensible cooling conditions when air temperature is reduced in the space, and latent cooling conditions where moisture is removed from the space. Sensible- and latent-cooling loads do not peak at the same time. During hot days the sensible-cooling load often far exceeds the latent cooling load, while on cooler but humid days the latent-cooling load can approach or even exceed the sensible-cooling load. A packaged HVAC unit, such as a VRF or CW system, with enough cooling capacity to meet the high latent-cooling load results in more supply airflow than necessary to meet sensible-cooling load. To avoid overcooling the space, the air conditioner must deliver the supply air at a warmer dry-bulb temperature. Unfortunately, this reduces the dehumidification capacity of the coil and raises the humidity level in the space, especially at part load. The right combination of cooling capacity and supply airflow (e.g., large compressors, small fan) simply may not exist in packaged air conditioners with prematched refrigeration and air-handling components.

The present disclosure describes a predictive humidity control system and method that employs alternative $CO_2$ set points to address the shortcomings of prior art HVAC systems and provide improved humidity control in conditioned spaces served by distributed HVAC systems with variable air volume (VAV) terminal equipment, as well as systems which employ VRF and CW terminal equipment.

FIG. 1 illustrates an exemplary embodiment of an environmental control system 100 in accordance with the present disclosure. System 100 is installed in a structure 102 having one or more discrete environmental control zones. Structure 102 may include without limitation a residential, commercial or industrial building, a shipping container, a recreational vehicle or mobile home, a temporary structure (e.g., temporary barracks), and so forth. Additionally, it should be understood that while the present example illustrates three environmental control zones identified as zone A 106, zone B 107, and zone C 108, the systems and methods described herein may be employed with any number of zones, including a single zone.

A dedicated outdoor air system (DOAS) 103 is mounted outdoors of structure 102, typically but not necessarily on the roof. DOAS 103 may include an air mover 105, such as a blower, and/or a heat exchange coil (not explicitly shown) to dehumidify outside air (OA). One such suitable DOAS is a Trane DX Outdoor Air Unit described in Trane Application Guide SYS-APG001-EN, the entirety of which is incorporated by reference herein for all purposes.

Outdoor air is supplied from DOAS 103 by duct 104 installed within structure 102. Duct 104 supplies outside air to one or more air valves 110. Air valve 110 is remotely-adjustable to control the volume of air flowing therethrough. As illustrated in FIG. 1, in some embodiments, air valve 110 may be configured to control the flow of outside air delivered to a terminal unit 114 such as shown with respect to zone 106. In these instances, terminal unit 114 may include an air handler or a variable air volume (VAV) box. In embodiments, terminal unit 114 is a mixed-air device that includes a return air inlet 113 through which return air (RA) is received from the conditioned space into terminal unit 114. The return air received from return air inlet 113 is mixed with outdoor air received from DOAS 103. In these embodiments terminal unit 114 delivers dehumidified air consisting of outdoor air blended with return air into the conditioned space. In embodiments, the proportion of outside air to return air may be adjusted in response to a signal received from one or more devices such as without limitation controller 130, temperature sensor 120, humidity sensor 122, and/or $CO_2$ sensor 124.

In embodiments where VRF and CW terminal equipment is employed, e.g., zones 107 and 108, air valve 110 may be configured to control the flow of outside air delivered directly into the conditioned space via an air register 112. Zone 107 for example includes a ceiling-mounted VRF unit 116 that cools and/or heats recirculated air (RA) within the conditioned space. Zone 108 for example includes a wall-mounted CW unit 118 that cools and/or heats recirculated air (RA) within the conditioned space. VRF unit 116 and/or CW unit 118 may include auxiliary heating elements (not explicitly shown) such as electrical (resistive) heating elements, gas-fired heaters, and the like.

Any, some, or all of zones 106, 107 and 108 may include a temperature sensor 120, a humidity sensor 122, and a $CO_2$ sensor 124 to measure the environmental conditions in the conditioned space. System 100 includes a controller 130 that is communicatively coupled to air valve 110, temperature sensor 120, humidity sensor 122, and $CO_2$ sensor 124. An outdoor environmental sensor 133 is communicatively coupled to controller 130 to facilitate measurement of outdoor conditions such as temperature, humidity, barometric pressure, rainfall, and so forth. Controller 130 is communicatively linked to via network 131 to weather data service 132 to receive current weather conditions and/or weather forecasts. A user device 134 communicatively coupled to controller 130 enables a user to adjust the configuration and operation of system 100.

Figure 2:
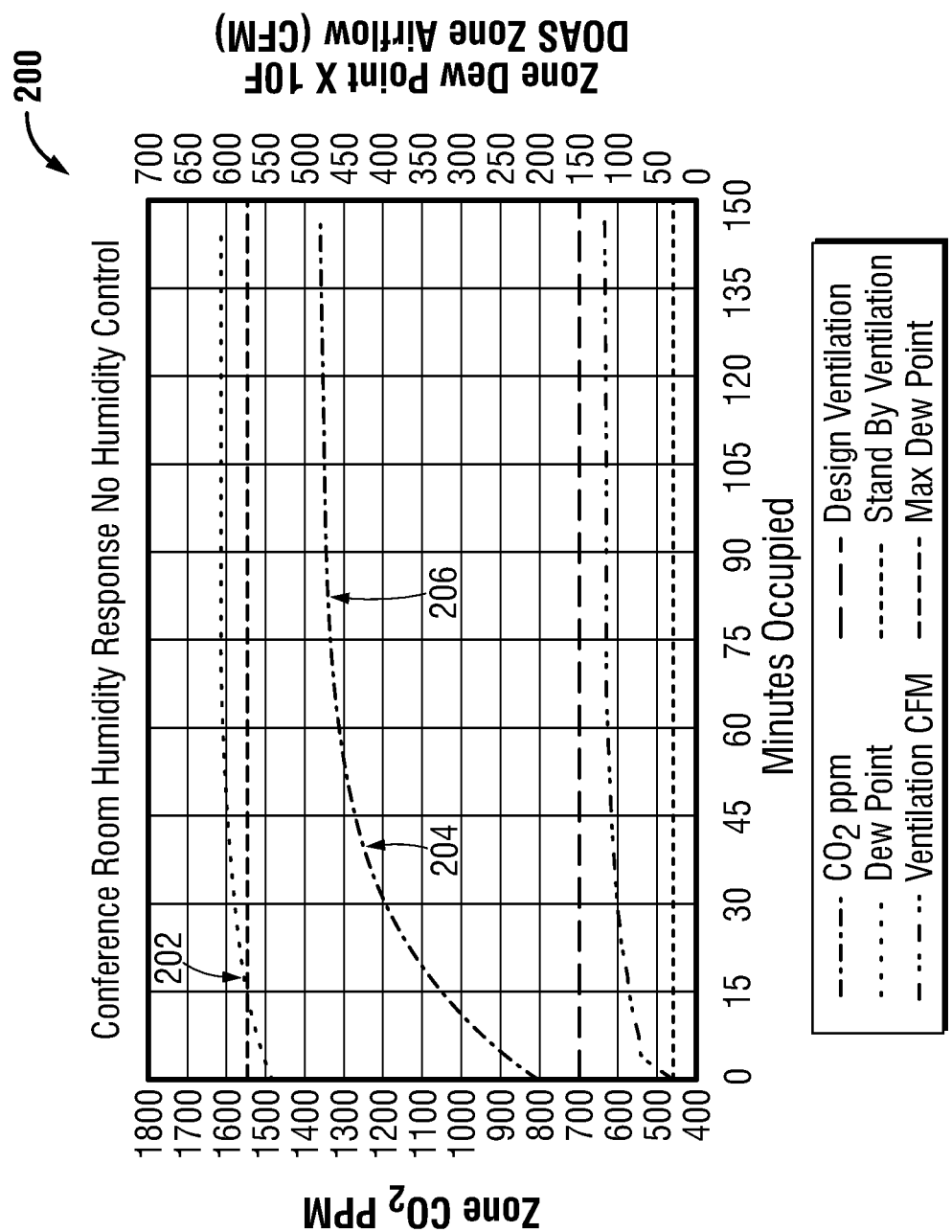
FIG. 2 is a graph illustrating the performance of a prior art system.
Figure 3:
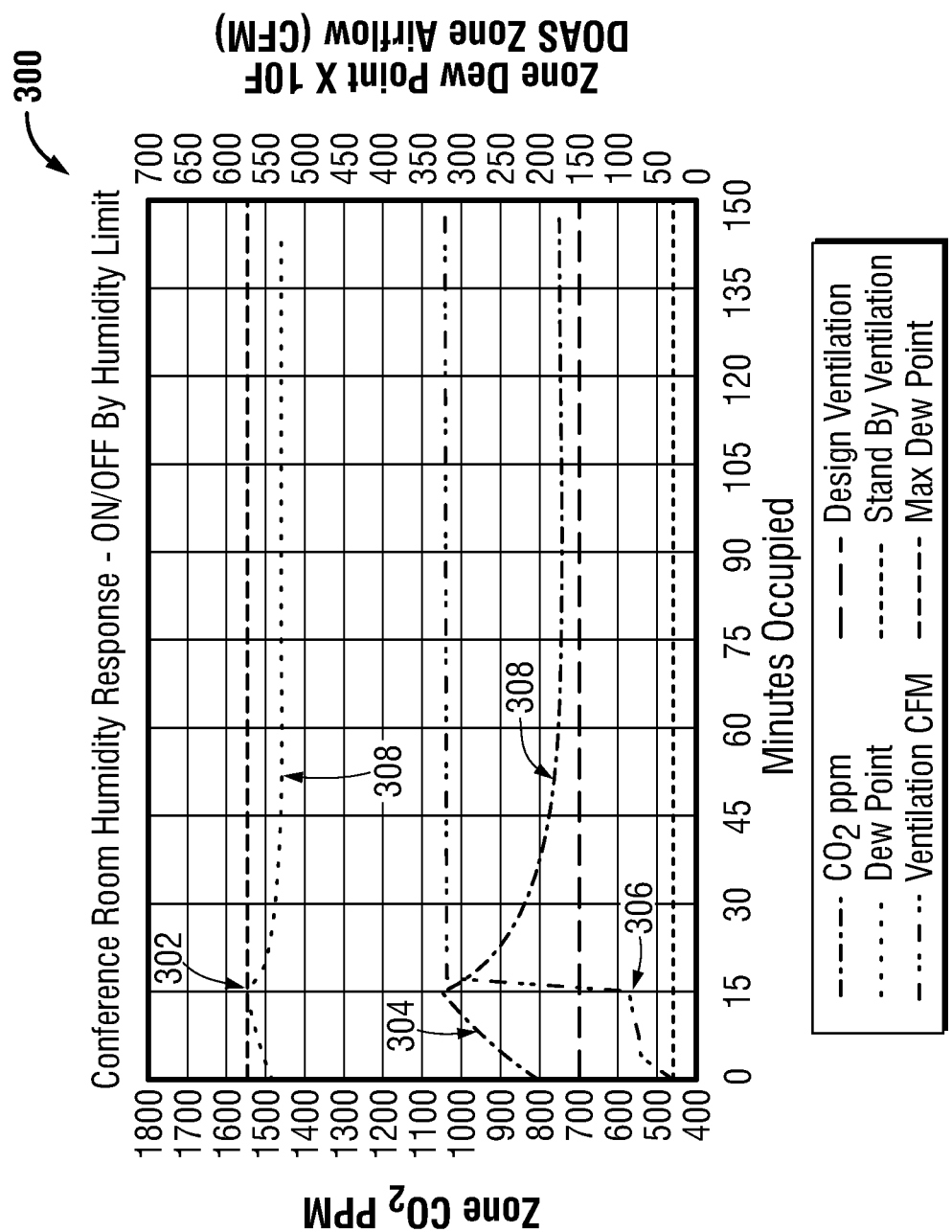
FIG. 3 is a graph illustrating the performance of another prior art system.

As discussed above, prior art humidity control systems have drawbacks, for example, the slow response time of such systems which results in overshoot and overall poor humidity control, which leads to occupant discomfort. For example, FIG. 2 is a graph 200 illustrating the performance of a prior art system which includes ventilation control but lacks humidity control. In FIG. 2, as well as in FIGS. 3 and 5 to follow, the x-axis represents the time from a change in occupancy, e.g., from an empty space to an occupied space; the left y-axis represents the $CO_2$ concentration of the space in PPM, and the right y-axis represents the humidity of the space as dew point temperature, and DOAS airflow. As can be seen in graph 200, increases in $CO_2$ and humidity correlate with increases in occupancy. At point 202 humidity surpasses the maximum allowable amount while at $CO_2$ continues to rise as shown at 204. Note that, although $CO_2$ and humidity reach a state of equilibrium at around 75 minutes into occupancy (point 206), humidity remains above the maximum allowable amount despite continuous ventilation. FIG. 3 is a graph 300 illustrating the performance of a prior art system which includes ventilation control and humidity control. In FIG. 3 humidity control is achieved by increasing the flow of outdoor air in response to humidity reaching a maximum dew point limit (point 302). Note that $CO_2$ increases commensurately with humidity (point 304). When outdoor airflow is increased (point 306), both humidity and $CO_2$ concentrations begin to decline (at 308), yet neither humidity nor $CO_2$ return to a desired target level until about 15-30 minutes past peak humidity discomfort at point 304. The effects of such performance lag is exacerbated in spaces which change occupancy frequently, which can result in humidity swings as the system unsuccessfully tries to keep up with constantly changing conditions.

Figure 4:
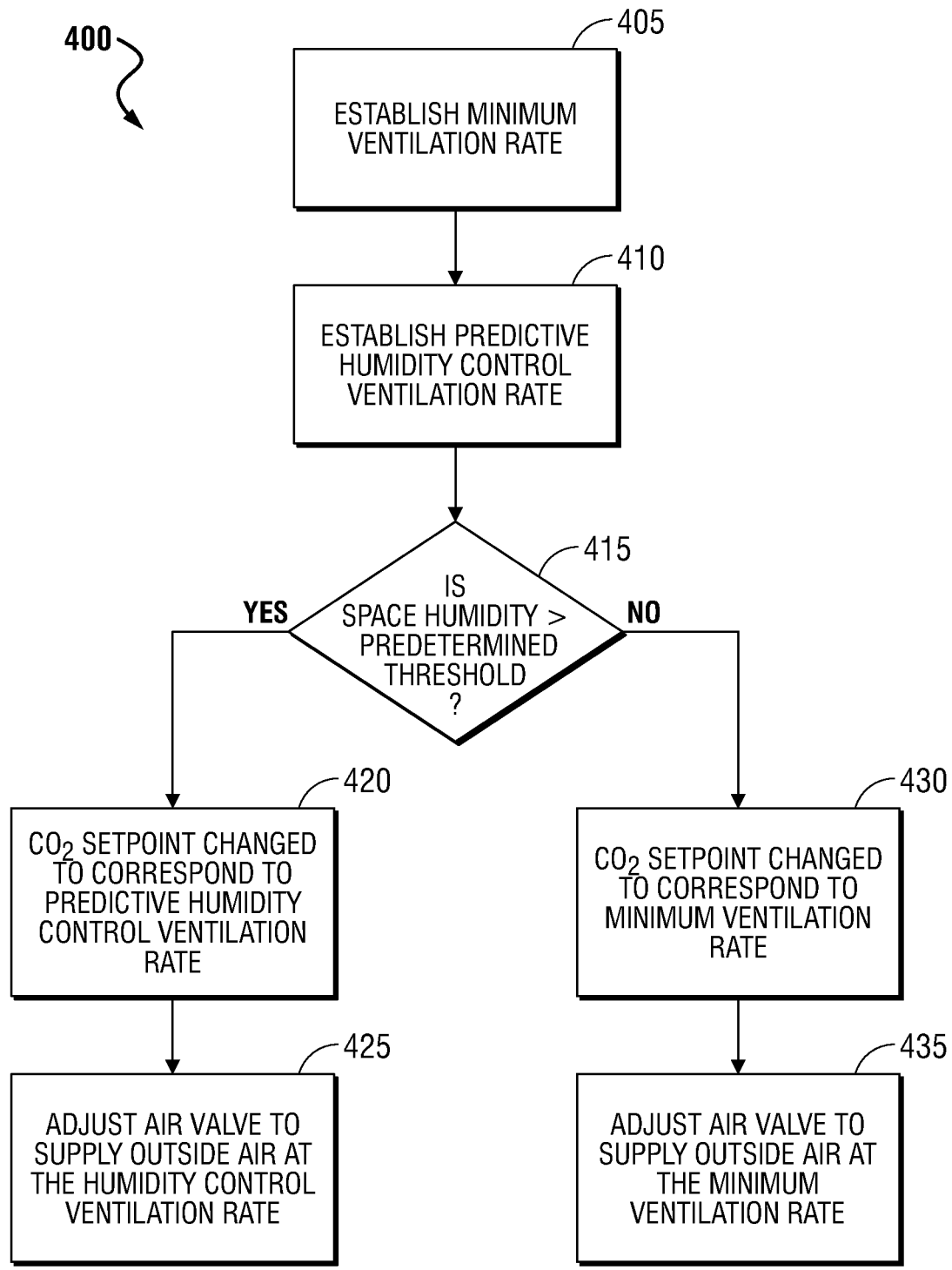
FIG. 4 is a flow diagram of an example, non-limiting method for humidity control of a conditioned space in accordance with one or more embodiments of the present disclosure.

FIG. 4 illustrates a method 400 of humidity control in accordance with the present disclosure. In step 405, the minimum (baseline) ventilation rate is determined in accordance with generally accepted industry standards. One such standard for computing a minimum ventilation rate for a conditioned space is described in ANSI/ASHRAE Standard 62.1-2016 and ASHRAE Guideline 36-2018, the entirety of each of which is incorporated by reference herein for all purposes. For example, ASHRAE Guideline 36-2018 provides that the minimum ventilation rate for a conditioned space may be computed according to the formula $CO_2$ setpoint$_{ventilation}$=0.9 ($CO_{OA}$+(8400 Ezm/($R_p$+(RaAz/Pz)))), hereinafter formula 1, wherein $CO_2$ setpoint$_{ventilation}$=minimum ventilation rate in CFM;

$CO_{OA}$=Outdoor $CO_2$ concentration;

m=Metabolic rate of occupants;

Ez=air distribution effectiveness of the zone;

Az=area of the zone;

$R_p$=outdoor airflow rate required per person;

Ra=outdoor airflow rate required per unit area; and

Pz=zone population (occupancy).

In step 410 the predictive humidity control ventilation rate is determined from the airflow quantity per occupant and the relationship of the occupant predicted water vapor emission rate and $CO_2$ emission rate. In an embodiment, the humidity control ventilation rate in accordance with the formula $CO_2$ setpoint$_{dehumidification}$=K ($CO_{DA}$ (8400 m/CFMp$_{hum}$)), hereinafter formula 2, wherein $CO_2$ setpoint$_{dehumidification}$=humidity control mode ventilation rate in CFM;

$CO_{OA}$=Outdoor $CO_2$ concentration;

m=Metabolic rate of occupants; and

CFMp$_{hum}$=Calculated Min Outside Air Flow per person for humidity control mode (see formula 3 below).

In formula 2, K may equal a constant, e.g., 0.9, which may be adjusted to fine tune the particular space as required. Alternatively, K may equal a variable in the range of about 0.7-1.3 which may be dynamically varied by controls, such as user controls, to optimize performance as desired.

The Calculated Min Outside Air Flow per person for humidity control mode (CFMp$_{hum}$) is computed in accordance with the formula CFMp$_{hum}$=Latent Load$_{per person}$/0.69 ($W_{Space}$-$W_{CA}$), hereinafter formula 3, wherein Wspace=Humidity ratio gr/lb of space target humidity level; and Wca=Humidity ratio gr/lb of DOAS conditioned air.

In an embodiment, $CO_2$ setpoint$_{ventilation}$ and $CO_2$ setpoint$_{dehumidification}$ are determined a priori by an HVAC system design engineer, installer, or the like, and stored in controller 130 for use.

In step 415 a determination is made as to whether a humidity metric of a conditioned space is greater than a predetermined threshold. In an embodiment, step 415 includes measuring the $CO_2$ concentration of the conditioned space and estimating the humidity of the conditioned space based on the $CO_2$ concentration to determine the humidity metric. In other embodiments, step 415 may include determining the occupancy of the conditioned space and estimating the humidity metric of the conditioned space based on the occupancy. In yet other embodiments, step 415 may include measuring the dew point of the conditioned space and determining the humidity metric of the conditioned space based on the dew point. In yet other embodiments, the determination step 415 may include a deadband of about around the threshold to avoid undesirable rapid toggling between states. In some embodiments, the deadband equates to about 1.5° F. dew point, e.g., the predictive humidity control ventilation rate is triggered at 1.5° F. below the humidity limit, while the minimum ventilation rate is triggered at 3.0° F. below the humidity limit. In still other embodiments, determination step 415 may be based at least in part upon current outdoor ambient conditions, such as without limitation, temperature, humidity, barometric pressure, solar index, and so forth. In yet other embodiments, determination step 415 may be based at least in part upon forecast (predicted) outdoor ambient conditions. In further embodiments, step 415 may be based at least in part on a measured humidity of the conditioned space. In still other embodiments, step 415 may be based at least in part on a schedule, such as without limitation an occupancy schedule.

If the humidity metric is greater (or not less than) than the predetermined threshold, then in step 420 the $CO_2$ setpoint is set to the predictive humidity control ventilation rate, and in step 425, the air valve 110 of the conditioned space is adjusted to supply outside air to the conditioned space at the predictive humidity control ventilation rate.

If the humidity metric is not greater (or less than) than the predetermined threshold, then in step 430 the $CO_2$ setpoint is set to the minimum ventilation rate, and in step 435, the air valve 110 of the conditioned space is adjusted to supply outside air to the conditioned space at the minimum ventilation rate.

Figure 5:
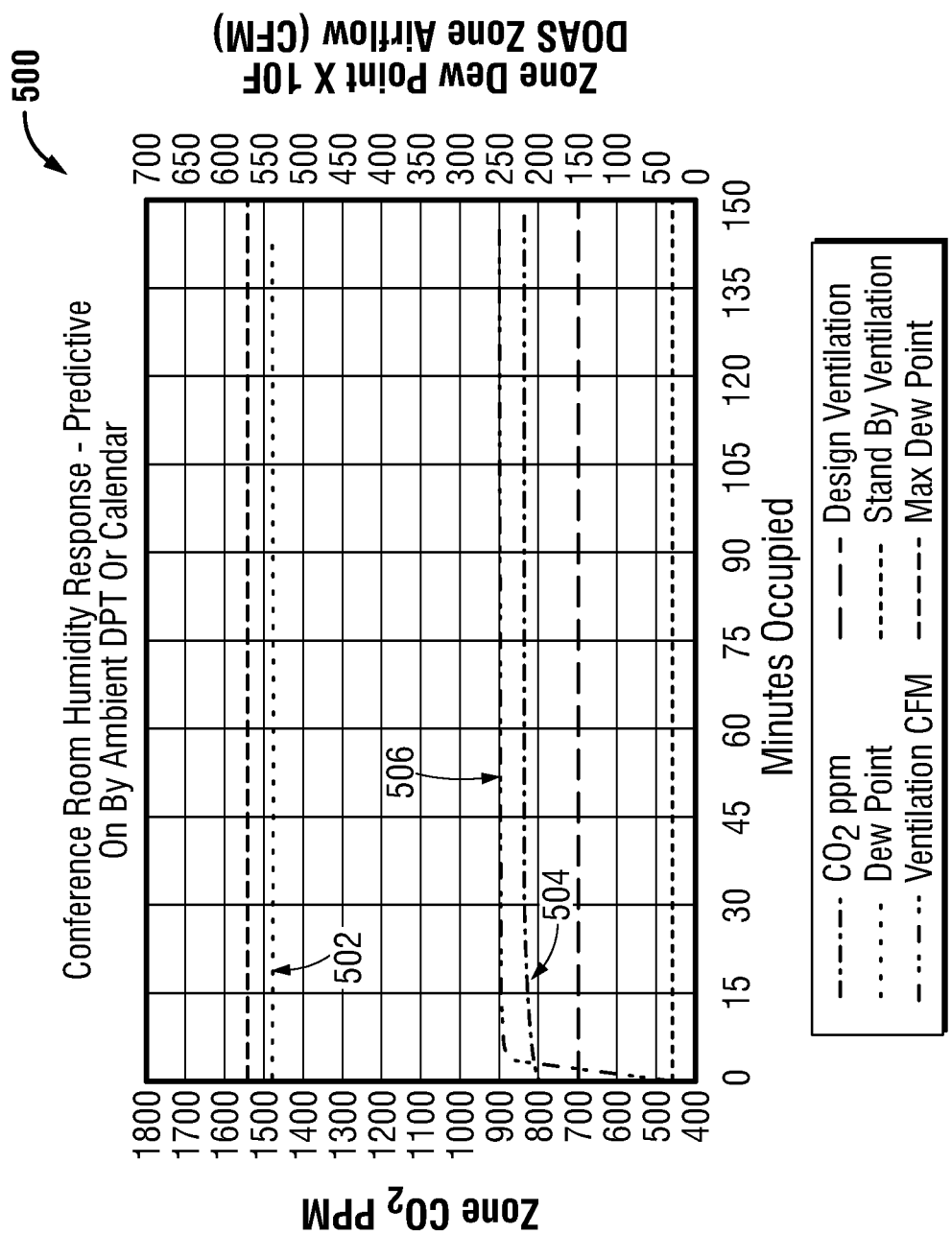
FIG. 5 is a graph illustrating the performance of a system in accordance with the present disclosure.

FIG. 5 illustrates a graph 500 illustrating the performance of a system in accordance with the present disclosure. As can be seen, introducing outside air at the predictive humidity control ventilation rate 506 derived from the airflow quantity per occupant and the relationship of the occupant predicted water vapor emission rate and $CO_2$ emission rate results in maintaining humidity 502 and $CO_2$ concentration 504 at essentially steady levels throughout the occupancy period with commensurate improvements in occupant comfort and system performance over prior art systems.

An example embodiment can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
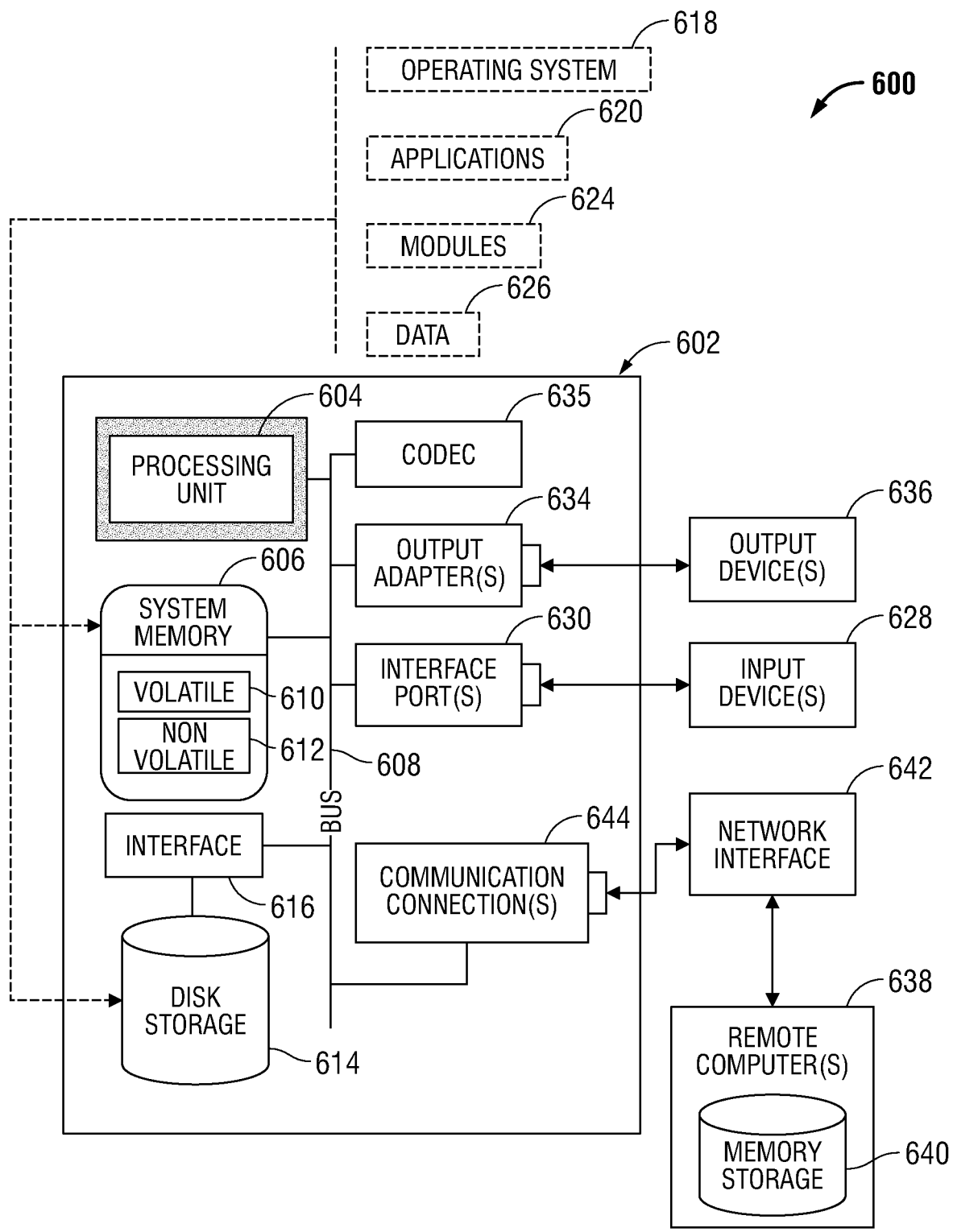
FIG. 6 is a block diagram of an example, non-limiting operating environment in which one or more embodiments described herein can be facilitated.

In connection with FIG. 6, the systems and processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

With reference to FIG. 6, an example environment 600 for implementing various aspects of the claimed subject matter includes a computer 602. The computer 602 includes a processing unit 604, a system memory 606, a codec 635, and a system bus 608. The system bus 608 couples system components including, but not limited to, the system memory 606 to the processing unit 604. The processing unit 604 can be any of various available processors such as an ARM Cortex A7 processor that can be implemented on a Digi ConnectCore 6UL module or the like. Dual microprocessors and other multiprocessor architectures also can be employed as the processing unit 604.

The system bus 608 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded Multi-Media Controller (eMMC), Universal Synchronous/Asynchronous Receiver/Transmitter (USART), Secure Digital (SD) Double Data Rate Type 3 (DDR3), and Open NAND Flash interface (ONFI).

The system memory 606 includes volatile memory 610 and non-volatile memory 612, which can employ one or more of the disclosed memory architectures, in various embodiments. The basic input/output system (BIOS), containing the basic routines to transfer information between elements within the computer 602, such as during start-up, is stored in non-volatile memory 612. In addition, according to present innovations, codec 635 can include at least one of an encoder or decoder, wherein the at least one of an encoder or decoder can consist of hardware, software, or a combination of hardware and software. Although, codec 635 is depicted as a separate component, codec 635 can be contained within non-volatile memory 612. By way of illustration, and not limitation, non-volatile memory 612 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 612 can employ one or more of the disclosed memory devices, in at least some embodiments. Moreover, non-volatile memory 612 can be computer memory (e.g., physically integrated with computer 602 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 610 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 602 can also include removable/non-removable, volatile/non-volatile computer storage medium. FIG. 6 illustrates, for example, disk storage 614. Disk storage 614 includes, but is not limited to, devices like a magnetic disk drive, solid state disk (SSD), flash memory card, or memory stick. In addition, disk storage 614 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 614 to the system bus 608, a removable or non-removable interface is typically used, such as interface 616. It is appreciated that storage devices 614 can store information related to a user. Such information might be stored at or provided to a server or to an application running on a user device. In one embodiment, the user can be notified (e.g., by way of output device(s) 636) of the types of information that are stored to disk storage 614 or transmitted to the server or application. The user can be provided the opportunity to opt-in or opt-out of having such information collected or shared with the server or application (e.g., by way of input from input device(s) 628).

It is to be appreciated that FIG. 6 describes software that acts as an intermediary between users and the basic computer resources described in the suitable operating environment 600. Such software includes an operating system 618. Operating system 618, which can be stored on disk storage 614, acts to control and allocate resources of the computer system 602. Applications 620 take advantage of the management of resources by operating system 618 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a resistive touch pad, capacitive touch pad, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port can be used to provide input to computer 602 and to output information from computer 602 to an output device 636. Output adapter 634 is provided to illustrate that there are some output devices 636 like monitors, speakers, and printers, among other output devices 636, which require special adapters. The output adapters 634 include, by way of illustration and not limitation, video and sound cards that provide a means of connection between the output device 636 and the system bus 608. It should be noted that other devices or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a router, a network PC, a workstation, a microprocessor-based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Computer 602 can operate using the BACnet protocol, which defines a number of data link/physical layers, including ARCNET, Ethernet, BACnet/IP, BACnet/IPv6, BACnet/MSTP, Point-To-Point over RS-232, Master-Slave/Token-Passing over RS-485, ZigBee, and LonTalk.

Communication connection(s) 644 refers to the hardware/software employed to connect the network interface 642 to the bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating an environmental control system that delivers dehumidified outdoor air into a conditioned space through an air valve, comprising:
   causing the air valve to control an airflow rate of the dehumidified outdoor air into the conditioned space to a first setpoint value to ventilate the conditioned space;
   determining a humidity metric of the conditioned space; and
   adjusting the air valve to control the airflow rate to a second setpoint value that per occupant is greater than the first setpoint value, in response to the humidity metric that is above a predetermined threshold.

2. The method in accordance with claim 1, wherein the method further comprises determining the second setpoint value from an airflow quantity per occupant, and a relationship of an occupant predicted water vapor emission rate and a carbon dioxide ($CO_2$) emission rate.

3. The method in accordance with claim 1, wherein the method further comprises computing the second setpoint value $CO_2$ setpoint$_{dehumidification}$ in accordance with the formula:

$$CO_2\ \text{setpoint}_{dehumidification} = K(CO_{OA} + (8400m/CFMp_{hum})),\ \text{and}$$

wherein K represents an adjustable constant or a variable, $CO_{OA}$ represents an outdoor carbon dioxide ($CO_2$) concentration, m represents a metabolic rate of occupants of the conditioned space, and $CFMp_{hum}$ represents a minimum outside airflow per occupant.

4. The method in accordance with claim 3, wherein $CFMp_{hum}$ is computed in accordance with the formula:

$$CFMp_{hum} = \text{Latent Load}_{per\ person}/0.69(W_{Space} - W_{CA}-),\ \text{and}$$

wherein $W_{Space}$ represents a humidity ratio of the conditioned space, and $W_{CA}$ represents ace a humidity ratio of conditioned air.

5. The method in accordance with claim 1, wherein the method further comprises computing the first setpoint value $CO_2$ setpoint$_{ventilation}$ in accordance with the formula:

$$CO_2\ \text{setpoint}_{ventilation} = 0.9(CO_{OA} + (8400Ezm/(R_p + (RaAz/Pz)))),\ \text{and}$$

wherein $CO_{OA}$ represents an outdoor carbon dioxide ($CO_2$) concentration, Ez represents an air distribution effectiveness in a zone of the conditioned space, m represents a metabolic rate of occupants of the conditioned space, $R_p$ represents an outdoor airflow rate required per occupant, Ra represents an outdoor airflow rate required per unit area, Az represents an area of the zone, and Pz represents an occupancy of the zone.

6. The method in accordance with claim 1, wherein adjusting the air valve comprises modulating the position of a damper positioned in a path of the dehumidified outdoor air.

7. The method in accordance with claim 1, wherein determining the humidity metric comprises:
   measuring a carbon dioxide ($CO_2$) concentration of the conditioned space; and estimating humidity of the conditioned space based on the $CO_2$ concentration.

8. The method in accordance with claim 1, wherein determining the humidity metric comprises:
   determining an occupancy of the conditioned space; and
   estimating the humidity metric of the conditioned space based on the occupancy.

9. The method in accordance with claim 1, wherein determining the humidity metric comprises measuring a dew point of the conditioned space.

10. The method in accordance with claim 1, wherein the humidity metric comprises a dew point of the conditioned space, and the predetermined threshold is between 1.5° F. less than a zone dewpoint limit and 3° F. less than a zone dewpoint limit.

11. The method in accordance with claim 1, wherein the humidity metric is determined based at least in part upon current outdoor ambient conditions.

12. The method in accordance with claim 1, wherein the humidity metric is determined based at least in part upon forecast outdoor ambient conditions.

13. The method in accordance with claim 1, wherein the humidity metric is determined based at least in part upon an occupancy schedule.

14. The method in accordance with claim 1, further comprising:
   mixing return air from the conditioned space with the dehumidified outdoor air; and
   delivering the mixture to the conditioned space.

15. An environmental control system that delivers dehumidified outdoor air into a conditioned space, comprising:
   a dedicated outdoor air unit;
   an air valve in fluid communication with the dedicated outdoor air unit;
   a terminal unit in fluid communication with the air valve; and
   a controller in operative communication with the air valve and comprising a processor and a memory, wherein the memory includes instructions executable on the processor which, when executed by the processor, cause the processor to:
   cause the air valve to control an airflow rate of the dehumidified outdoor air into the conditioned space to a first setpoint value to ventilate the conditioned space;
   determine a humidity metric of the conditioned space; and
   adjust the air valve to control the airflow rate to a second setpoint value that per occupant is greater than the first setpoint value, in response to the humidity metric that is above a predetermined threshold.

16. The environmental control system in accordance with claim 15, the memory further including instructions executable on the processor which, when executed by the processor, cause the processor to determine the second setpoint value from an airflow quantity per occupant, and a relationship of an occupant predicted water vapor emission rate and a carbon dioxide ($CO_2$) emission rate.

17. The environmental control system in accordance with claim 15, the memory further including instructions executable on the processor which, when executed by the processor, cause the processor to compute the second setpoint value $CO_2$ setpoint$_{dehumidification}$ in accordance with the formula $$CO_2\ \text{setpoint}_{dehumidification} = K(CO_{OA} + (8400m/CFMp_{hum})), \text{ wherein } CFMp_{hum} \text{ is}$$

computed in accordance with the formula $$CFMp_{hum} = \text{Latent Load}_{per\ person}/0.69(W_{Space} - W_{CA}-),$$

wherein K represents an adjustable constant or a variable, $CO_{OA}$ represents an outdoor $CO_2$ concentration, m represents a metabolic rate of occupants of the conditioned space, and $CFMp_{hum}$ represents a minimum outside airflow per occupant, and wherein $W_{Space}$ represents a humidity ratio of the conditioned space, and $W_{CA}$ represents a humidity ratio of conditioned air.

18. An environmental system controller, comprising:
   a processor;
   a communications interface operatively coupled to the processor; and
   a memory operatively coupled to the processor, wherein the memory includes instructions executable on the processor which, when executed by the processor, cause the processor to:
   cause the air valve to control an airflow rate of the dehumidified outdoor air into the conditioned space to a first setpoint value to ventilate the conditioned space;
   determine a humidity metric of the conditioned space; and
   issue an air valve adjustment command to adjust an air valve to control the airflow rate to a second setpoint value that per occupant is greater than the first setpoint value, in response to the humidity metric that is above a predetermined threshold.

19. The environmental system controller in accordance with claim 18, wherein the memory further includes instructions executable on the processor which, when executed by the processor, cause the processor to determine the second setpoint value from an airflow quantity per occupant, and a relationship of an occupant predicted water vapor emission rate and a carbon dioxide $CO_2$ emission rate.

20. The environmental system controller in accordance with claim 18, the memory further including instructions executable on the processor which, when executed by the processor, cause the processor to determine the second setpoint value $CO_2$ setpoint$_{dehumidification}$ in accordance with the formula $$CO_2\ \text{setpoint}_{dehumidification} = K(CO_{OA} + (8400m/CFMp_{hum})), \text{ wherein } CFMp_{hum} \text{ is}$$

computed in accordance with the formula $$CFMp_{hum} = \text{Latent Load}_{per\ person}/0.69(W_{Space} - W_{CA}-),$$

wherein K represents an adjustable constant or a variable, $CO_{OA}$ represents an outdoor $CO_2$ concentration, m represents a metabolic rate of occupants of the conditioned space, and $CFMp_{hum}$ represents a minimum outside airflow per occupant, and wherein $W_{Space}$ represents a humidity ratio of the conditioned space, and $W_{CA}$ represents a humidity ratio of conditioned air.

* * * * *